Dec. 6, 1955  W. R. CROOKS  2,725,897
DAMPENER
Filed Nov. 5, 1953  2 Sheets-Sheet 1
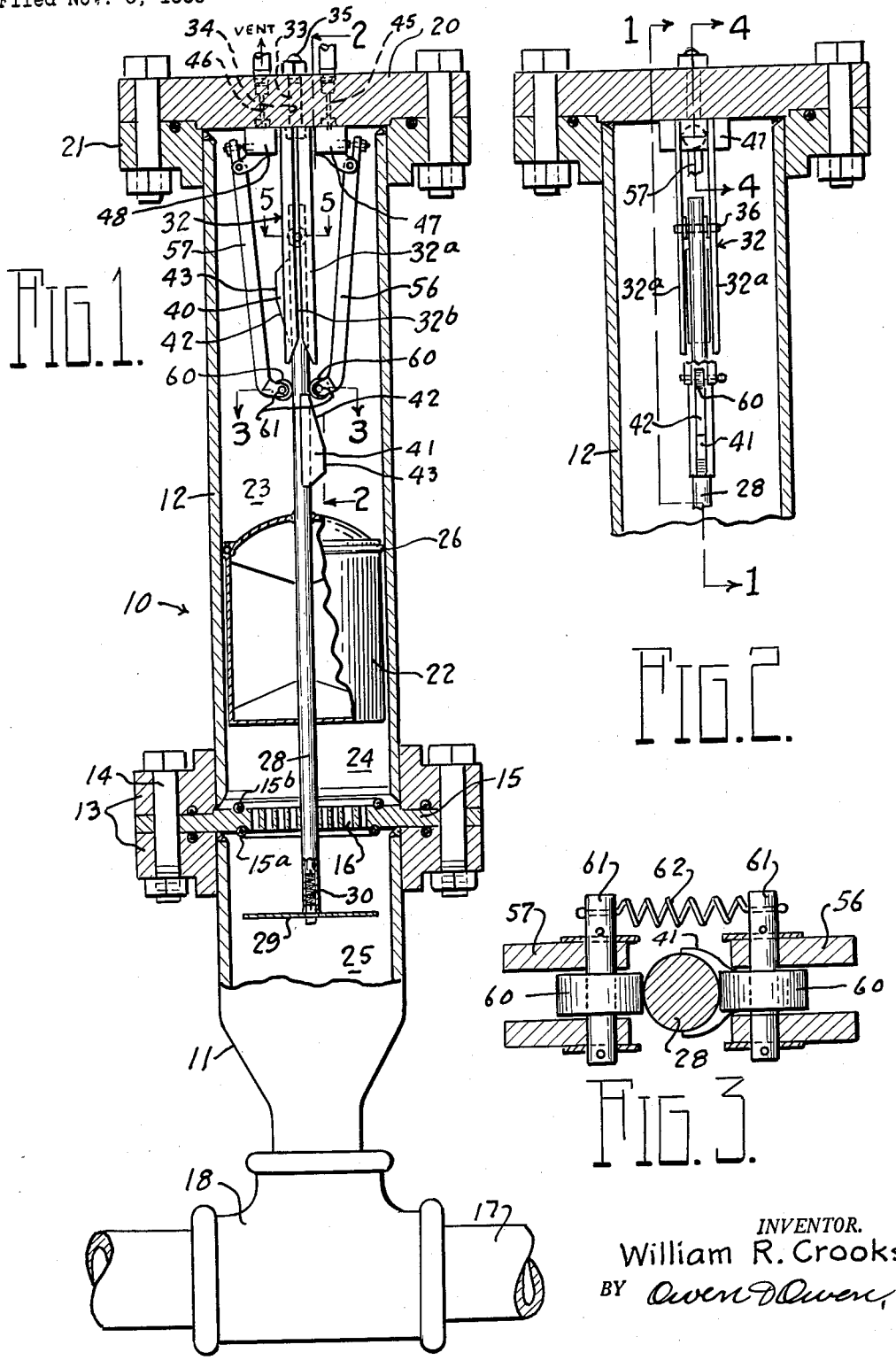
INVENTOR.
William R. Crooks
BY Owen & Owen
ATTORNEYS Dec. 6, 1955          W. R. CROOKS          2,725,897
                         DAMPENER
Filed Nov. 5, 1953                    2 Sheets-Sheet 2
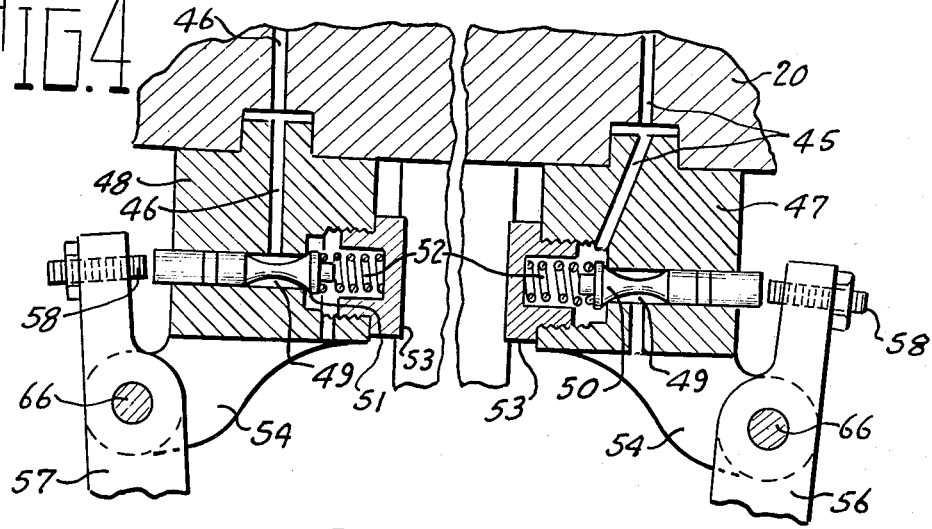
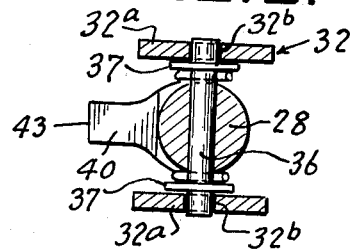
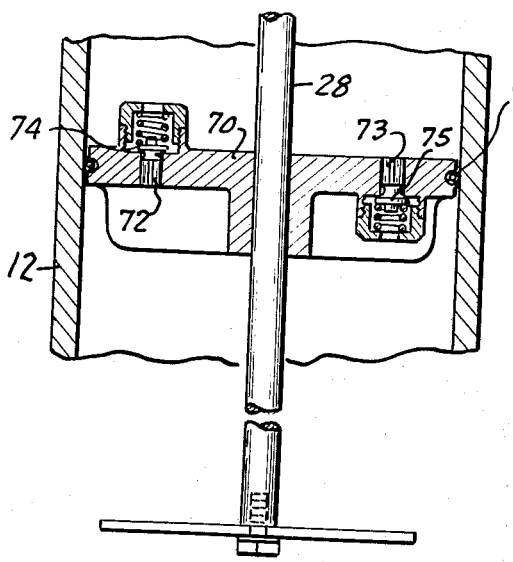
INVENTOR.
William R. Crooks
BY Owen & Owen
ATTORNEYS

United States Patent Office 2,725,897
Patented Dec. 6, 1955

2,725,897

DAMPENER

William R. Crooks, Mount Vernon, Ohio, assignor to The Cooper-Bessemer Corporation, Mt. Vernon, Ohio, a corporation of Ohio Application November 5, 1953, Serial No. 390,335

4 Claims. (Cl. 138—31)

This invention relates to automatically operated dampeners or pressure accumulators used in connection with hydraulic pressure systems to reduce and cushion shocks produced by surges of liquid and pressure variations therein. In devices of this class, it is customary to utilize a compressible gaseous fluid, such as air, to cushion the shock in hydraulic systems resulting from surge conditions or sudden variations of pressures therein.

The primary object of the invention is the provision of simple, efficient and novel means for automatically controlling the pressure of the gaseous fluid in the dampener to maintain a substantially uniform pressure relationship between it and the normal pressure in the hydraulic system.

A further object is the provision in a device of this character of safety seal means which is automatically operable to render the device inoperative upon a failure of the gaseous fluid supply thereto or when the gas pressure drops below a predetermined value, thus permitting the hydraulic system to operate exactly the same as if no dampener were employed.

A further object is the provision of simple and efficient means for purging, from the air side of the dampener, any liquid which may have accumulated therein from the liquid side.

A further object of the invention is the provision of a dampener of this class of improved and simplified construction and operation, whereby to enhance the practicability and commercial value thereof and to simplify the purging of liquid from the air chamber and the cleaning and making of repairs in the device.

Further objects and advantages of the invention will be apparent from the following detailed description and from the accompanying drawings forming a part thereof, in which—

Fig. 1 is a longitudinal section of a dampener embodying the invention taken substantially on the line 1—1 in Fig. 2, with parts in full;

Fig. 2 is a section on the line 2—2 in Fig. 1;

Fig. 3 is an enlarged section on the line 3—3 in Fig. 1;

Fig. 4 is an enlarged fragmentary detail of the upper end portion of the device showing the pressure control valves closed;

Fig. 5 is an enlarged section on the line 5—5 in Fig. 1, and

Fig. 6 is an enlarged fragmentary central longitudinal section of a portion of the device in Fig. 1, with a piston type of pressure responsive member substituted for the float member in said figure.

Referring to Fig. 1 of the drawings, 10 designates a dampener or surge control unit embodying one form of the invention. This unit is generally cylindrical in shape and comprises, in the present instance, an inner section 11 and an outer section 12. These sections are provided at their adjacent ends with flange fittings 13 drawn together by bolts 14 and serving to clamp a stop plate 15 therebetween.

The plate 15 is perforated, as at 16, to provide communication between the two chambers formed by the two sections 11 and 12. Control means hereinafter described is adapted to seat against the liquid pressure side of said plate to close said communication. The section 11 is in open communication with the associated hydraulic pressure line 17 through a T coupling 18.

The outer section 12 is closed at its outer end in any suitable manner as, for instance, by an end plate 20 bolted and sealed to an end flange 21 of the section. A pressure responsive separating member, in the present instance in the nature of a float 22, is mounted for reciprocatory movements in the section 12 and divides it into an outer chamber 23, which may be termed a gas pressure chamber, and an inner liquid line pressure chamber 24, the latter having communication through the perforated plate 15 with the line pressure chamber 25 in the inner section 11. The float 22 preferably has a very slight clearance in the cylinder section 12 and has an O-ring 26 which further reduces the clearance around the float and, in effect, forms a seal with the walls of the chamber. The device would operate with a direct exposure of liquid to gas in the small area around the float, in the clearance between the float and the cylinder. However, it is desirable to keep the gas and liquid separated to prevent intermingling and absorption, so that the O-ring is introduced as a means of reducing clearance and not as a packing in the usual sense.

The float 22 is carried by a rod 28 which, at its inner end, projects through a central guide opening in the stop place 15 and carries a valve plate 29 within the chamber 25. The spacing of the float and valve plate on the rod 28 is such that under normal operating conditions both the float and valve plate stand in spaced relation to the stop plate 15 substantially as shown in Fig. 1. The valve plate 29 is connected to the inner end of the rod 28 through a coiled contractile spring 30 that is mounted and anchored in a housing at such end of the rod. This permits a yielding stop action of the valve plate when closing against the stop plate which takes place only when the air supply to the outer chamber 23 fails or is seriously reduced.

The outer end portion of the guide rod 28 in the gas chamber 23 is guided by a longitudinally split guide 32 fixed to and projecting inwardly from the end plate 20. This guide is preferably shouldered against the end plate and has a stem 33 projecting through a central opening 34 in the plate and is provided at its outer end with a jam nut 35 cooperating with the guide shoulder to rigidly anchor the guide to the plate. As shown in Fig. 5, the guide 32 has two longitudinally extending, laterally spaced side members 32ᵃ radially spaced from the rod 28, and each of these is longitudinally split to form a guideway 32ᵇ in which the respective end of a cross-guide pin 36 on the rod 28 travels to guide the rod movements and to prevent rotation thereof. Guide washers 37 are provided on the pin ends to have sliding contact with the inner sides of the respective members 32ᵃ.

For the purpose of regulating the pressure within chamber 23, two cams 40 and 41 are carried in longitudinally spaced relation by the upper end portion of the guide rod 28 and project radially therefrom in opposite directions for travel in the respective spaces between the two members 32ᵃ of the guide 32. Each cam is elongated lengthwise of the rod and has its inner end with respect to the other cam provided at its outer side edge with a slope 42 extending from the respective side plane of the rod to a land 43 that is radially spaced from the rod.

The end plate 20 has inlet and vent passages 45 and 46 (Figs. 1 and 4) disposed at opposite sides of the plate center and extending to the interior of the chamber 23 through respective valve blocks 47 and 48. The passage 45 serves as an inlet to the chamber 23 from any suitable source of air or other gaseous fluid pressure supply, and the passage 46 serves as a vent from the chamber. Each passage is interrupted in the respective block by a valve passage 49 in which valves 50 and 51 are respectively mounted, the former serving as an inlet and the latter as an outlet valve for the chamber 23. A coiled expansion spring 52 acts on the inner end of each valve 50 to normally retain it seated and to project its outer end from the respective block at its outer side, as shown in Fig. 4. The springs are retained in the blocks by cage nuts 53.

Each block 47, 48 is provided on its bottom (Fig. 4) with spaced ears 54 receiving a pivot pin 66 on which an operating lever for the respective valve 50 is fulcrumed for rocking movements radially and in the plane of the float rod cams 41 and 42. These levers are designated 56 and 57 and each has a short arm at its outer end carrying a thrust stud 58 in register with and adapted to engage the outer exposed end of the respective valve 50, 51 and force it inward to open the associated passage 45 or 46 when the lever is rocked for the purpose. The long inwardly projecting arm of each lever extends along a respective side of the rod 28 in the plane of movement of the cams 40, 41, and has its free end angled and forked to receive a roller 60 mounted on a pin 61 therein (Figs. 1 and 3). The rollers 60 of the two levers have opposed neutral engagement with the float rod intermediate the two cams 40 and 41. Upon a predetermined outward movement of the float 22 from the substantially neutral or normal position shown in Fig. 1, the cam 41 engages the roller of lever 56 and rocks the lever to cause an inward movement of the valve 50 to open position to admit compensating gas pressure to the chamber 23, thus causing a return of the float to neutral position. Likewise, should the differential pressures at opposite sides of the float 22 be such that the member moves inwardly a predetermined distance from neutral position, the cam 40 will then engage the roller 60 of lever 57 and rock the lever to open the vent valve 51. This action releases a portion of the gas in chamber 23, lowering the pressure and permitting the member 22 to return to neutral position. The two rollers 60 are held in opposed yielding engagement with rod 28 by a coiled contractile spring 62 connecting extended ends of the pins 61 (Fig. 3).

It is thus apparent that the pressure responsive member 22 is automatically maintained at approximately neutral position by the admission of gaseous pressure to or its release from the chamber 23 during operating conditions and as may be called for by variations from normal of the gas pressure at one side and the liquid pressure at the other side of the member.

Should, for any reason, a complete failure of gas pressure occur in the chamber 23, the outward movement of the float 22 under liquid line pressure will be stopped by engagement of the valve plate 29 with the stop plate 15. At the same time the plate 29 will close the perforations 16 and prevent further admission of liquid pressure to the chamber 24 against the float. The valve plate 29 seats against an O-ring seal 15ª on the inner side of the stop plate 15. The seating of the valve plate thus effectually seals the communication between the chambers 24 and 25 and renders the dampener inoperative. Upon a reduction of pressure in the liquid line the inward movement of the float 22 is stopped by engagement with the upper plate 15 and this engagement takes place against an upper O-ring 15ᵇ on the plate. As the gas above the float is thus sealed against leakage, it is not wasted in the event of a temporary shutdown of the system of which pipe 17 is a part.

In Fig. 6 is illustrated a modification of the device in which a piston 70 is substituted in the cylinder 12 for the float 22 to act as the differential pressure responsive separating member. This piston is fixedly attached to the rod 28 and has its periphery provided with an O-ring gasket 71 to seal against leakage of pressure from one side to the other thereof.

The piston 70 is preferably provided with two passages 72 and 73 therethrough, in the former of which, in the present instance, is a spring seated check valve 74 adapted to open under predetermined pressure on the liquid pressure side of the piston, while in the other passage is a spring seated check valve 75 adapted to open under predetermined pressure on the gas pressure side of the piston. The purpose of the valve 74 is to serve as a safety valve to permit equalizing of pressures on both sides of the piston when the differential exceeds a certain value, thus preventing damage to the dampening mechanism should failure of the gas pressure supply occur, and also to prevent such damage occurring should the safety valve plate 29 for any reason become inoperative to close the communication between the two chambers 24 and 25 by seating against the perforated plate 15. In other words, the valve 74 provides a safety feature for the device which may be in addition to that afforded by the valve plate 29.

The valve 75 is to permit the purging of any liquid which may accumulate in the chamber 23 and which purging may occur when the differential pressure between the gas and liquid is say approximately twenty-five pounds greater on the gas side. To effect this purging, the vent line from the chamber 23 is manually closed by any suitable valve therein (not shown). The liquid discharge pressure is then lowered until the piston 70 rests on the grid member 15, and when the differential pressure between the air and liquid is, for example, approximately twenty-five pounds greater on the gas side, the valve 75 will open permitting purging of the liquid into the liquid pressure line system.

In operation of the dampener, sufficient air or other gaseous pressure is admitted to the chamber 23 to oppose the normal liquid line pressure in the chamber 24 and cause the pressure responsive float member, which may be either the float 22 or piston 70, to stand in its neutral position with the lever roller 60 engaging the rod 28 in the space intermediate the two cams 40, 41. Upon the occurrence of any sudden shock or surge condition in the liquid line, its effect is cushioned by movement of the float member against the compressible gaseous fluid in the chamber 23. Should such movement be greater than necessary to absorb the shock, or should the pressure level show a constant increase in line 17, the cam 41 will engage roller 60 of the lever 56, thereby opening the valve to permit the admission of gaseous pressure to increase the pressure in chamber 23, the pressure of the supply source being sufficient for the purpose. Should the increase of pressure in the chamber 23 be more than necessary to counterbalance the opposing liquid line pressure, or should the pressure level in line 17 show a constant decrease, the movable pressure responsive member (float or piston) will move toward the stationary valve plate 15 sufficiently for the cam 40 to engage and actuate the lever 57 to open the vent passage 46 and release the excess pressure in the chamber. When sufficient pressure has been released to permit return of the pressure sure member to its neutral position, the cam 40 rsponsive member to its neutral position, the cam 40 passes from engagement with its lever and the vent valve closes. Should the pressure in the chamber 23 or its source of supply for any reason fail, the outward movement of said member beyond a predetermined point is stopped by the valve plate 29 on the rod 28 striking the partition plate 15 and this at the same time closes and seals the communication between the two chambers 24 and 25. In this manner, the dampener means is automatically disconnected from the liquid pressure line so as to avoid any damage to such means which might otherwise occur.

With the modification shown in Fig. 6, the presence of the relief passage 73 and valve 75 in the piston 70 permits an automatic purging of liquid from the chamber 23 under predetermined differential pressure conditions at opposite sides of the piston. Thus, should it be desired to have the valve open when the differential pressure between the air and liquid is approximately twenty-five pounds greater on the air side, the closing spring for the valve will have a sufficient closing pressure for the purpose.

I wish it understood that my invention is not limited to any specific construction, arrangement or form of the parts, as it is capable of numerous modifications and changes without departing from the spirit of the claims.

What I claim is:

1. A dampener for liquid pressure systems comprising a pressure responsive separating member, means guiding the movements of said member and forming a gas pressure chamber at one side and a liquid pressure chamber at the other side of the member, the latter adapted to have connection with a liquid pressure system, said gas pressure chamber having in an end portion thereof which opposes said separating member, a vent passage and a gas pressure supply passage, a normally closed valve in each of said passages, means within said gas pressure chamber operable by predetermined movements of said separating member under pressure in the liquid pressure chamber to open said gas supply passage valve to admit pressure to the gas pressure chamber and return the member substantially to normal operating position, and means within the gas pressure chamber operable by predetermined movements of said separating member under pressure in the gas pressure chamber to open said vent passage for exhaust of gas pressure to permit return of the member substantially to normal operating position, each of said means including an operating cam and lever connection between the separating member and respective valve.

2. A dampener for liquid pressure systems comprising a cylinder, a pressure responsive separating member in the cylinder dividing it into a gas pressure chamber and a liquid pressure chamber, the latter for connection to said system, said gas pressure chamber having a vent passage and a gas pressure supply passage, a normally closed valve in each of said passages, two levers fulcrumed in the gas chamber, one associated with and operable to open said vent valve and the other associated with and operable to open said other valve, and two cams attached to the separating member within the gas pressure chamber, one cam coacting with one of said levers to open the vent valve during predetermined movement of the separating member in one direction and the other cam coacting with said other lever to open the gas supply passage valve during predetermined movement of the separating member in the opposite direction.

3. A dampener for liquid pressure systems comprising a cylinder, a pressure responsive separating member in said cylinder dividing it into a gas pressure chamber and a liquid pressure chamber, the latter for connection to said system to receive surge pressures therefrom, a vent passage and a gas pressure supply passage at the outer end portion of said gas pressure chamber, a normally closed valve in each of said passages, a rod projecting from the separating member into the gas pressure chamber lengthwise thereof, means guiding the movements of the rod, two longitudinally extending cams carried by said rod on different sides thereof and spaced lengthwise of the rod, two levers fulcrumed in the gas pressure chamber in position for one to be actuated by one of said cams to open the vent passage upon predetermined movement of the separating member in one direction effected by excessive gas pressure in the gas pressure chamber and the other lever being actuated by the other cam upon predetermined movement of said member in the opposite direction to open said gas supply pressure valve when excess pressure is present in said liquid chamber.

4. A dampener for attachment to liquid pressure systems, comprising a cylinder, a pressure responsive separating member in the cylinder dividing it into an outer gas pressure chamber and an inner liquid pressure chamber, the latter for connection to the system, a rod projecting from said member within the gas pressure chamber toward its outer end and movable therewith, said gas pressure chamber having in its outer end a vent passage and a gas pressure supply passage, a normally closed valve in each passage, two levers fulcrumed in the gas pressure chamber near its outer end and extending lengthwise thereof, one lever associated with the vent valve and operable to open it, the other lever associated with the gas passage valve and operable to open it, and two cams on said rod spaced lengthwise thereof, the outer cam engaging and imparting a valve opening movement to the vent valve operating lever when said member has predetermined inward movement under excess gas chamber pressure and the inner cam engaging and imparting a valve opening movement to the other valve lever when the member has predetermined outward movements under excess liquid chamber pressure.

References Cited in the file of this patent

UNITED STATES PATENTS

| | | |
|---|---|---|
| 1,310,560 | Cook | July 22, 1919 |
| 1,905,133 | Bishop et al. | Apr. 25, 1933 |
| 1,948,988 | Lupfer | Feb. 27, 1934 |
| 2,022,443 | Stollberg | Nov. 26, 1935 |
| 2,417,873 | Huber | Mar. 25, 1947 |
| 2,668,603 | Winslow | Feb. 9, 1954 |
| 2,673,527 | Ashton | Mar. 30, 1954 |